(12) United States Patent
Sun et al.

(10) Patent No.: US 11,639,464 B2
(45) Date of Patent: May 2, 2023

(54) CONTROLLING THE FORMATION OF POLYMER-METAL COMPLEXES IN WELLBORE OPERATIONS

(71) Applicant: Halliburton Energy Services, Inc., Houston, TX (US)

(72) Inventors: Hong Sun, Houston, TX (US); Dong Shen, The Woodlands, TX (US); Gladys Rocio Montenegro, Humble, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 17/299,751

(22) PCT Filed: Dec. 7, 2018

(86) PCT No.: PCT/US2018/064499
§ 371 (c)(1),
(2) Date: Jun. 3, 2021

(87) PCT Pub. No.: WO2020/117269
PCT Pub. Date: Jun. 11, 2020

(65) Prior Publication Data
US 2022/0017816 A1    Jan. 20, 2022

(51) Int. Cl.
*C09K 8/68* (2006.01)
*C09K 8/88* (2006.01)

(52) U.S. Cl.
CPC .............. *C09K 8/885* (2013.01); *C09K 8/68* (2013.01)

(58) Field of Classification Search
None
See application file for complete search history.

(56) References Cited

U.S. PATENT DOCUMENTS

| 3,704,750 | A | 12/1972 | Miles et al. |
| 5,262,061 | A | 11/1993 | Gill et al. |
| 5,302,293 | A | 4/1994 | Kaplan et al. |
| 6,527,914 | B1 * | 3/2003 | Shevchenko .......... D21H 17/05 162/158 |

(Continued)

OTHER PUBLICATIONS

Dulin, James, Bill Grieser, and James Benkley. "Identification and Remediation of Produced Solids Accumulation Occurring after Massive Hydraulic Water Fracs." SPE Production and Operations Symposium. Society of Petroleum Engineers, 2015.

(Continued)

*Primary Examiner* — Andrew Sue-Ako
(74) *Attorney, Agent, or Firm* — Barnes & Thornburg, LLP

(57) ABSTRACT

Treatment fluids and associated methods for treating a subterranean formation. An example method includes introducing a treatment fluid into a wellbore penetrating the subterranean formation. The treatment fluid includes a competitive metal binder selected from the group consisting of polyamino polyether methylene phosphonic acid, hydoxyethylamino-di(methylene phosphonic acid), and a combination thereof; a polymer capable of forming a polymer-metal complex; and an aqueous fluid. The method further includes contacting a metal ion with the treatment fluid after introduction of the treatment fluid into the wellbore and binding the metal ion with the competitive metal binder.

20 Claims, 6 Drawing Sheets

(56) References Cited

U.S. PATENT DOCUMENTS

| | | | |
|---|---|---|---|
| 8,236,734 B1 | 8/2012 | Shen et al. | |
| 2011/0076219 A1 | 3/2011 | Ravishankar et al. | |
| 2013/0157905 A1 | 6/2013 | Saini et al. | |
| 2013/0206398 A1* | 8/2013 | Tufano | C09K 8/62 166/308.1 |
| 2014/0264151 A1* | 9/2014 | Ko | C23G 1/20 252/79.1 |
| 2014/0303049 A1* | 10/2014 | Holdsworth | C09K 8/575 52/741.1 |
| 2015/0114653 A1 | 4/2015 | Conway et al. | |
| 2015/0152329 A1* | 6/2015 | Seetharaman | C23F 11/149 548/254 |
| 2017/0096597 A1 | 4/2017 | Hu et al. | |
| 2017/0350236 A1* | 12/2017 | Shen | E21B 43/14 |

OTHER PUBLICATIONS

International Search Report and Written Opinion dated Sep. 6, 2019; International PCT Application No. PCT/US2018/064499.

Karthik, B. Balanaga, P. Selvakumar, and C. Thangavelu. "Phosphonic Acids used as Corrosion Inhibitors—A Review." Asian Journal of Chemistry 24.8 (2012).

* cited by examiner

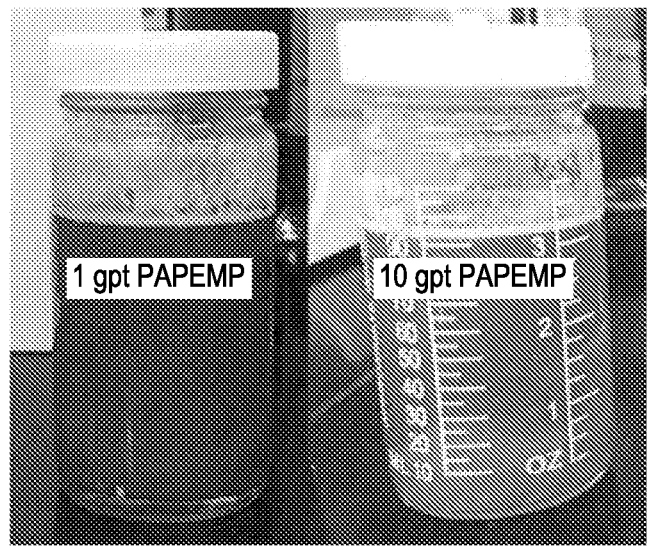
FIG. 7
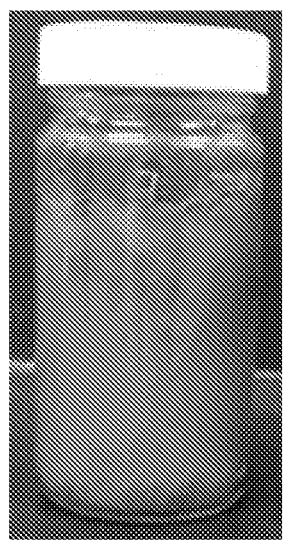 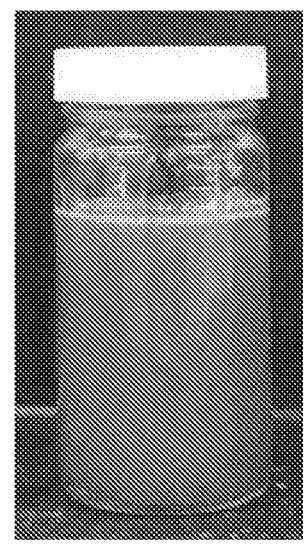
FIG. 8  FIG. 9

US 11,639,464 B2

CONTROLLING THE FORMATION OF POLYMER-METAL COMPLEXES IN WELLBORE OPERATIONS

TECHNICAL FIELD

The present disclosure relates generally to wellbore operations, and more particularly, to wellbore operations utilizing polymeric friction reducers that are susceptible to binding metals and forming polymer-metal complexes.

BACKGROUND

Hydrocarbon producing formations may be stimulated by hydraulic fracturing treatments. In traditional hydraulic fracturing operations, a fracturing fluid (e.g., pad fluid, proppant-laden fluid, etc.) is pumped at a rate and pressure sufficient to create or enhance one or more fractures in the formation. Some fracturing fluids have low viscosities. These types of fracturing fluids are sometimes referred to as slickwater fluids. Due to their low viscosity, proppant transport may be achieved by increasing pumping rates. However, this may result in energy loss due to friction between the tubulars and the turbulent fluid flow. A friction reducer may be used to reduce the horsepower requirement during the fracturing treatment by changing the turbulent flow to a laminar flow in the tubulars.

Reducing the friction of the fracturing fluid may be beneficial for forming complex fracture networks in some formations, for example, tight shale formations. However, in order to function as desired, the friction reducer polymers should remain uncrosslinked to prevent undesired fluid viscosity increases and flocculation of the friction reducer polymer. Some friction reducer polymers may complex with metals present in the formation or produced from wellbore operations such as acidizing. The present disclosure provides improved methods and compositions for treating formations with friction reducer polymers.

BRIEF DESCRIPTION OF THE DRAWINGS

Illustrative examples of the present disclosure are described in detail below with reference to the attached drawing figures, which are incorporated by reference herein, and wherein:

FIG. 7 is a photograph illustrating treated cationic polymer-based slickwater fracturing fluids after addition of iron (III) in accordance with one or more examples described herein;

FIG. 8 is a photograph illustrating flocculation in an amphoteric polymer-based slickwater fracturing fluid after addition of iron(III) in accordance with one or more examples described herein;

FIG. 9 is a photograph illustrating a treated amphoteric polymer-based slickwater fracturing fluid after addition of iron(III) in accordance with one or more examples described herein;

Figure 1:
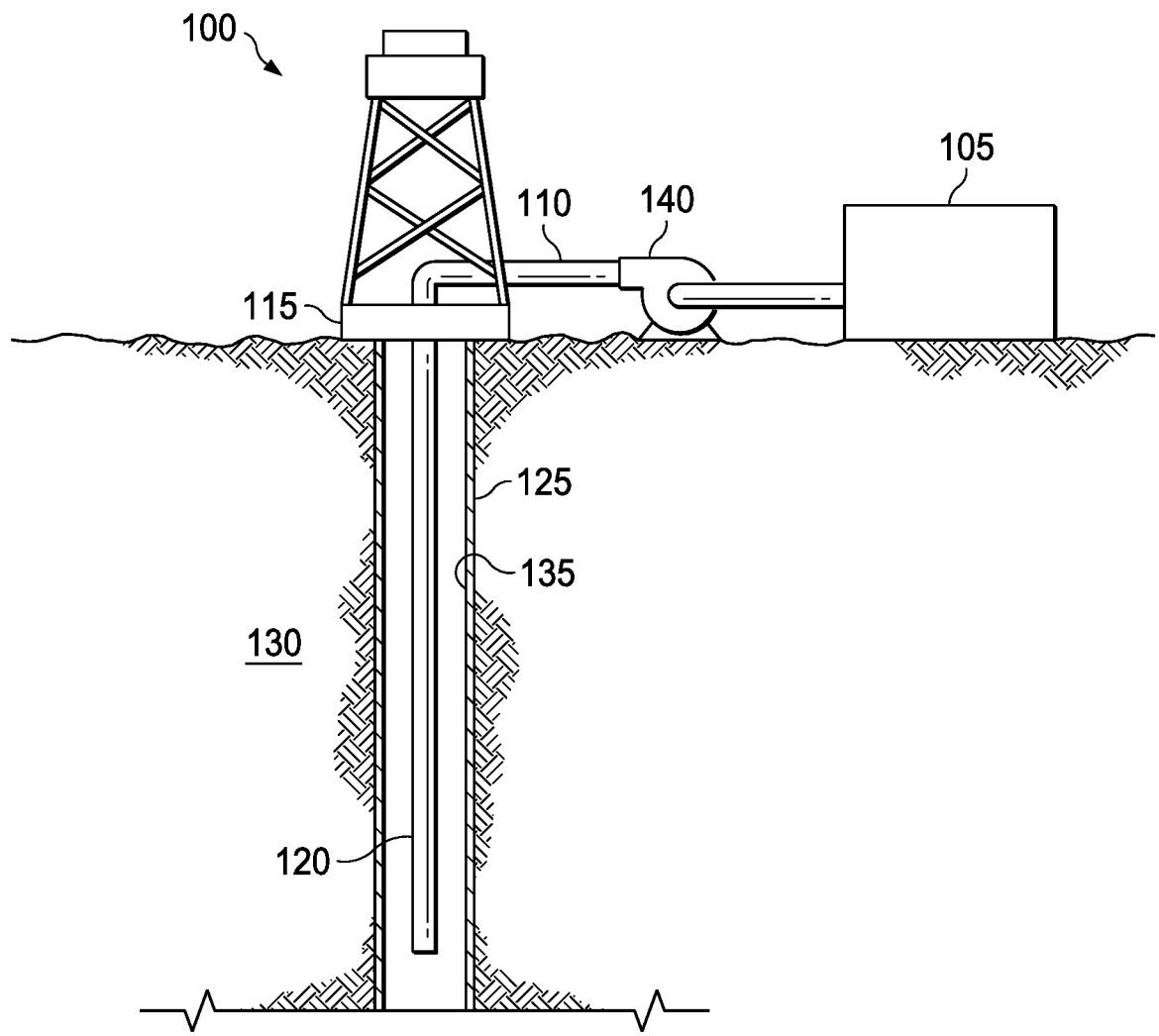
FIG. 1 is a schematic illustrating a system of surface equipment for the preparation and delivery of a treatment fluid to a wellbore in accordance with one or more examples described herein.

The illustrated figures are only exemplary and are not intended to assert or imply any limitation with regard to the environment, architecture, design, or process in which different examples may be implemented.

DETAILED DESCRIPTION

The present disclosure relates generally to wellbore operations, and more particularly, to wellbore operations utilizing polymeric friction reducers that are susceptible to binding metals and forming polymer-metal complexes.

In the following detailed description of several illustrative examples, reference is made to the accompanying drawings that form a part hereof, and in which is shown by way of illustration, examples that may be practiced. These examples are described in sufficient detail to enable those skilled in the art to practice them, and it is to be understood that other examples may be utilized and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present disclosure. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Unless otherwise specified, any use of any form of the terms "connect," "engage," "couple," "attach," or any other term describing an interaction between elements is not meant to limit the interaction to direct interaction between the elements and may also include indirect interaction between the elements described. Further, any use of any form of the terms "connect," "engage," "couple," "attach," or any other term describing an interaction between elements includes items integrally formed together without the aid of extraneous fasteners or joining devices. In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

As used herein, the term "formation" encompasses the term "reservoir," referring to a portion of the formation which has sufficient porosity and permeability to store or transmit fluids (e.g., hydrocarbons). As used herein, the term "treatment fluid" refers generally to any fluid that may be used in a subterranean application in conjunction with a desired function and/or for a desired purpose. The term "treatment fluid" does not imply any particular action by the fluid or any component thereof.

The examples described herein relate to the use of competitive metal binders in wellbore operations. The competitive metal binders may be provided to a treatment fluid intended to be introduced into a wellbore penetrating a subterranean formation. The treatment fluid may comprise polymeric friction reducers that are susceptible to forming polymer-metal complexes. Advantageously, the competitive metal binders bind metals that may contact the treatment fluid. For example, the competitive metal binders may bind iron species that induce crosslinking and/or flocculation of polymers with an affinity towards iron. This iron may then be unavailable to bind with said polymers. An additional advantage is that the competitive metal binders may prevent undesired increases in the viscosity of the treatment fluid locally due to flocculation. One other advantage is that the competitive metal binders may prevent the formation of polymer-metal complexes that may flocculate into thick, rubbery aggregates and impair hydrocarbon production. A still further advantage is that the competitive metal binders may not impact the functionality of the treatment fluid. Another advantage is that the competitive metal binders allow for the use of polymers that are susceptible to forming polymer-metal complexes in operations treating metal-rich formations. A still further advantage is that the competitive metal binders allow for the use of polymers that are susceptible to forming polymer-metal complexes in wellbore operations that may produce metal species. Examples of these operations are the spearhead portion of a fracturing operation and any operation in which an acid may contact metals in the formation or rust in the tubulars/downhole tools.

The treatment fluid comprises a competitive metal binder. The competitive metal binder comprises polyamino polyether methylene phosphonic acid, hereafter "PAPEMPA," or hydoxyethylamino-di(methylene phosphonic acid), hereafter "HEMPA." In some examples, a combination of PAPEMPA and HEMPA may be used. PAPEMPA is of the following structure:

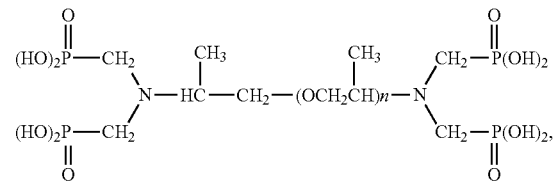

wherein n may be 1 to 10. HEMPA is of the following structure:

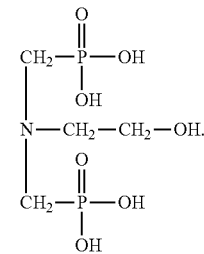

PAPEMPA and HEMPA may compete with polymers within the treatment fluids to bind metal ions such as iron(II) and iron(III). This competitive binding may be of benefit in treatment fluid operations in which complexing of metals and polymers is undesirable, for example, in operations using polymeric friction reducers susceptible to cross-linking with metal ions.

The competitive metal binder may preferentially bind with metal species encountered in the wellbore to prevent said metal species from forming polymer-metal complexes. As such, the competitive metal binder may have an affinity for these metal species greater than that of the polymers susceptible to forming the polymer-metal complexes. The competitive metal binders prevent contact of the metals with the polymers by successfully binding and sequestering the metals before they are able to form the polymer-metal complexes. In some examples, the competitive metal binders may bind metals already bound to a polymer in a polymer-metal complex. This subsequent binding may prevent further polymer binding to the metal and inhibit crosslinking of the polymers. Inhibition of crosslinking prevents the polymers from increasing the viscosity of the treatment fluid and from forming flocculates that can impair hydrocarbon production and/or interfere with downhole tools and equipment.

The concentration of the competitive metal binder in the treatment fluid may range from about 0.001% (w/w) to about 5% (w/w). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the competitive metal binder in the treatment fluid may range from about 0.001% (w/w) to about 5% (w/w), from about 0.005% (w/w) to about 5% (w/w), from about 0.01% (w/w) to about 5% (w/w), from about 0.05% (w/w) to about 5% (w/w), from about 0.1% (w/w) to about 5% (w/w), from about 0.5% (w/w) to about 5% (w/w), from about 1% (w/w) to about 5% (w/w), or from about 3% (w/w) to about 5% (w/w). As another example, the concentration of the competitive metal binder in the treatment fluid may range from about 0.001% (w/w) to about 5% (w/w), from about 0.001% (w/w) to about 3% (w/w), from about 0.001% (w/w) to about 1% (w/w), from about 0.001% (w/w) to about 0.5% (w/w), from about 0.001% (w/w) to about 0.1% (w/w), from about 0.001% (w/w) to about 0.05% (w/w), from about 0.001% (w/w) to about 0.01% (w/w), or from about 0.001% (w/w) to about 0.005% (w/w). With the benefit of this disclosure, one of ordinary skill in the art will be readily able to prepare a treatment fluid having a sufficient concentration of the competitive metal binder for a given application.

The competitive metal binder may be used to bind metals present in the subterranean formation and/or produced during a wellbore operation. Examples of these metal species include, but are not limited to, $Fe^{2+}$, $Fe^{3+}$, $Cr^{3+}$, $Cr^{4+}$, $Al^{3+}$, $Sb^{5+}$, $Ti^{4+}$, $Zr^{4+}$, or any combination thereof.

The treatment fluid comprises a polymer. The polymer is susceptible to forming a polymer-metal complex. The polymer may be anionic, cationic, or amphoteric. In some examples, the polymer is a polyacrylamide-based polymer. In some examples, the polymer comprises an acrylic acid moiety, a 2-acrylamido-2-methylpropane sulfonic acid moiety, a trimethyl aminoethyl acrylate moiety, a trimethyl aminoethyl methacrylate moiety, or a combination thereof. In fracturing operations, the polymer generally includes an ethylene (i.e., vinyl) repeating unit including a —C(O)N$(R^1)_2$ group, and/or an ethylene repeating unit including a —C(O)O$R^2$ group, where at each occurrence, $R^1$ is independently selected from the group consisting of —H, —$C_2H_4$OH, —$CH_3$, or —$(CH_2)_n CH_3$ and where n=0 to 25. At each occurrence, $R^2$ is independently selected from the group consisting of —H, a substituted or unsubstituted (C1-C20) hydrocarbyl, or a counterion selected from H, Li, Na, K, Cs, Be, Mg, Ca, Sr, Ba, Cr, Fe, Mn, Co, Ni, Cu, Ga, In, or $NH_4$. It is to be understood that the polymer should not be a polymer in which formation of a polymer-metal complex is desired, for example, a fluid in which polymer-gelation or increases in viscosity from polymer crosslinking is desired.

The concentration of the polymer in the treatment fluid may range from about 0.001% (w/w) to about 20% (w/w). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the polymer in the treatment fluid may range from about 0.001% (w/w) to about 20% (w/w), from about 0.005% (w/w) to about 20% (w/w), from about 0.01% (w/w) to about 20% (w/w), from about 0.05% (w/w) to about 20% (w/w), from about 0.1% (w/w) to about 20% (w/w), from about 0.5% (w/w) to about 20% (w/w), from about 1% (w/w) to about 20% (w/w), from about 3% (w/w) to about 20% (w/w), from about 5% (w/w) to about 20% (w/w), from about 10% (w/w) to about 20% (w/w), or from about 15% (w/w) to about 20% (w/w). As another example, the concentration of the polymer in the treatment fluid may range from about 0.001% (w/w) to about 20% (w/w), from about 0.001% (w/w) to about 15% (w/w), from about 0.001% (w/w) to about 10% (w/w), from about 0.001% (w/w) to about 5% (w/w), from about 0.001% (w/w) to about 3% (w/w), from about 0.001% (w/w) to about 1% (w/w), from about 0.001% (w/w) to about 0.5% (w/w), from about 0.001% (w/w) to about 0.1% (w/w), from about 0.001% (w/w) to about 0.05% (w/w), from about 0.001% (w/w) to about 0.01% (w/w), or from about 0.001% (w/w) to about 0.005% (w/w). With the benefit of this disclosure, one of ordinary skill in the art will be readily able to prepare a treatment fluid having a sufficient concentration of the polymer for a given application.

The treatment fluids described herein comprise an aqueous fluid, for example, freshwater, saltwater (e.g., water containing one or more salts dissolved therein), brine (e.g., saturated saltwater, including saturated saltwater produced from subterranean formations), seawater, or any combination thereof. Generally, the aqueous fluid may be from any source provided that the aqueous fluid does not contain an excess of compounds that may undesirably affect other components in the treatment fluid. In the case of brines, the aqueous fluid may comprise a monovalent brine or a divalent brine. Suitable monovalent brines may include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like. One of ordinary skill in the art, with the benefit of this disclosure, should be readily able to select an aqueous fluid for a chosen application.

The treatment fluid may be any fluid in which it is desirable to prevent polymer-metal complexes from forming. Examples of treatment fluids include, but are not limited to, fracturing fluids, acidizing fluids, polymer flooding fluids for enhanced oil recovery, and fluids for coiled tubing milling.

In some optional examples, the treatment fluid may further comprise a pH adjustor. The pH adjustor may be any chemical agent sufficient for adjusting the pH of the treatment fluid to a desired range without negatively impacting the functionality of the other treatment fluid components. In some examples, the pH range of the treatment fluid is about 2 to about 12. General examples of the pH adjustor include, but are not limited to, hydroxides, borates, formates, acetates, carbonates, carbamates, phosphates, phosphonates, sulfates, sulfonates, or any combinations thereof. A preferred example of the pH adjustor is ammonium hydroxide. In some examples, a high pH range may be preferred such as if the fluid is a brine. In some examples, the pH range may be adjusted to be greater than 7.

In some optional examples, the treatment fluid may contain a pH control agent (e.g., a buffer) such as carbonate or bicarbonate to prevent rapid changes in pH. In some examples, the treatment fluid does not comprise a pH control agent. Examples of pH control agents include, but are not limited to, phosphate, dihydrogen phosphate, monohydrogen phosphate, sulfate and bisulfate, sulfite and bisulfite, boric acid, borate salts and polyborate species (e.g., perborate, metaborate, pentaborate, tetraborate, diborate, $B[OH]_4^-$, $B_2[OH]_5^-$, $B_2[OH]_7^-$, $BO_2^-$, $B_4O_7^{2-}$, $B_2O_3$, $[BO_2]_2$, $BO_4^-$, $B_4O_5(OH)_4^{2-}$, $B_3O_3(OH)_4^-$, $B_5O_6(OH)_4^-$, $B_2O(OH)_5^{3-}$, $B_2[OH]_7^-$; etc.), non-stoichiometric borates (e.g., ulexite mineral), or any combinations thereof.

In some optional examples, the treatment fluid may comprise an additive. The additive may be used to adjust a property of the treatment fluid, for example, viscosity, density, etc. Examples of the additives include, but are not limited to, silica scale control additives, corrosion inhibitors, surfactants, gel stabilizers, anti-oxidants, polymer degradation prevention additives, relative permeability modifiers, scale inhibitors, foaming agents, defoaming agents, anti-foaming agents, iron control agents, particulate diverters, salts, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, paraffin/asphaltenes inhibitors, emulsion breaker, hydrate inhibitors, consolidating agents, bactericides, clay stabilizers, breakers, delayed release breakers, the like, or any combination thereof. With the benefit of this disclosure, one of ordinary skill in the art will be able to formulate a treatment fluid having properties suitable for a desired application.

The present disclosure provides treatment fluids, methods, and systems for treating a subterranean formation. The treatment fluids include a competitive metal binder and a polymer susceptible to forming polymer-metal complexes. The methods may include preparing the treatment fluid comprising the competitive metal binder and a polymer susceptible to forming polymer-metal complexes. The methods may include pumping the treatment fluid in a wellbore penetrating a subterranean formation. The methods may also include introducing the treatment fluid into a portion of the subterranean formation from the wellbore. The systems may include pumping and mixing equipment to convey the treatment fluid to the interval of the wellbore comprising the target subterranean formation.

Example systems may comprise a pump fluidly coupled to a tubular, the tubular containing a treatment fluid as described herein. The pump may be a high-pressure pump. As used herein, the term "high-pressure pump" will refer to a pump that is capable of delivering a fluid downhole at a pressure of about 1000 psi or greater. A high-pressure pump may be used when it is desired to introduce the treatment fluid to a subterranean formation at or above a fracture gradient of the subterranean formation, but it may also be used in cases where fracturing is not desired. In some examples, the high-pressure pump may be capable of fluidly conveying particulate matter, such as proppant particulates, into the subterranean formation. Suitable high-pressure pumps will be known to one having ordinary skill in the art and may include, but are not limited to, floating piston pumps and positive displacement pumps. In other examples, the pump may be a low-pressure pump. As used herein, the term "low-pressure pump" will refer to a pump that operates at a pressure of about 1000 psi or less. In some examples, a low-pressure pump may be fluidly coupled to a high-pressure pump that is fluidly coupled to the tubular. That is, the low-pressure pump may be configured to convey the treatment fluid to the high-pressure pump. In such examples, the low-pressure pump may "step up" the pressure of the treatment fluid before it reaches the high-pressure pump. In any example, a high-pressure pump and/or a low-pressure pump may convey the treatment fluid to the location of a target subterranean formation. The pumps may supply sufficient pressure to allow the treatment fluid to fracture the subterranean formation. That is, the pumps may meet or exceed the fracture gradient of the subterranean formation.

In some examples, the systems described herein may further comprise a mixing tank that is upstream of the pump and is the vessel in which the treatment fluid is formulated. In various examples, the pump (e.g., a low-pressure pump, a high-pressure pump, or a combination thereof) may convey the treatment fluid from the mixing tank to the transporting conduit. In other examples, the treatment fluid may be formulated offsite and transported to a worksite, in which case the treatment fluid may be introduced to the transporting conduit via the pump either directly from its shipping container (e.g., a truck, a railcar, a barge, or the like) or from a transport pipeline. In either case, the treatment fluid may be drawn into the pump, elevated to an appropriate pressure, and then introduced into the transporting conduit for delivery downhole.

When desired for use, the competitive metal binder may be added to aqueous fluid and the polymer and mixed as desired. In alternative examples, the competitive metal binder may be added to the aqueous fluid followed by the polymer and then mixed as desired. In some examples, the polymer may be hydrated before it is introduced to the aqueous fluid. The components and additives of the treatment fluid may be added or introduced to one another in any order and at any time during the use of the treatment fluid.

FIG. 1 illustrates a schematic of the surface and near-surface portions of a system that can deliver the treatment fluids described herein to a downhole location, according to one or more examples. It should be noted that while FIG. 1 generally depicts a land-based system, it is to be recognized that like systems may be operated in subsea locations as well. As depicted in FIG. 1, system 100 may include mixing tank 105, in which a treatment fluid comprising a competitive metal binder and a polymer susceptible to forming polymer-metal complexes may be formulated. In some examples, the polymer may be a friction reducer. The treatment fluid may be conveyed via line 110 to wellhead 115, where the treatment fluid enters tubular 120. Tubular 120 may extend from wellhead 115 into a wellbore 125 penetrating subterranean formation 130. Wellbore 125 may be any type of wellbore including vertical, horizontal, deviated, etc. The illustrated portion of wellbore 125 is cased with a casing 135. It is to be understood that in some examples wellbore 125 may be uncased. Upon being ejected from tubular 120, the treatment fluid may subsequently enter into subterranean formation 130 as described in FIG. 2 below. Pump 140 may be configured to raise the pressure of the treatment fluid to a desired degree before its introduction into tubular 120. Examples of treatment fluids may include, but are not limited to, fracturing fluids, acidizing fluids, fluids used for enhanced oil recovery, or any such fluids comprising polymers and in which formation of polymer-metal complexes is undesirable.

Although not depicted in FIG. 1, the treatment fluid may, in some examples, flow back to wellhead 115 and exit subterranean formation 130. In some optional examples, the treatment fluid that has flowed back to wellhead 115 may subsequently be recovered and recirculated to subterranean formation 130. As the treatment fluid comprises the competitive metal binder, the polymers within the treatment fluid may not be crosslinked and may not form flocculates. As such, the polymers may be in a substantially similar state upon recovery to that of their introduction or with a much smaller molecular weight if a breaker was applied.

Figure 2:
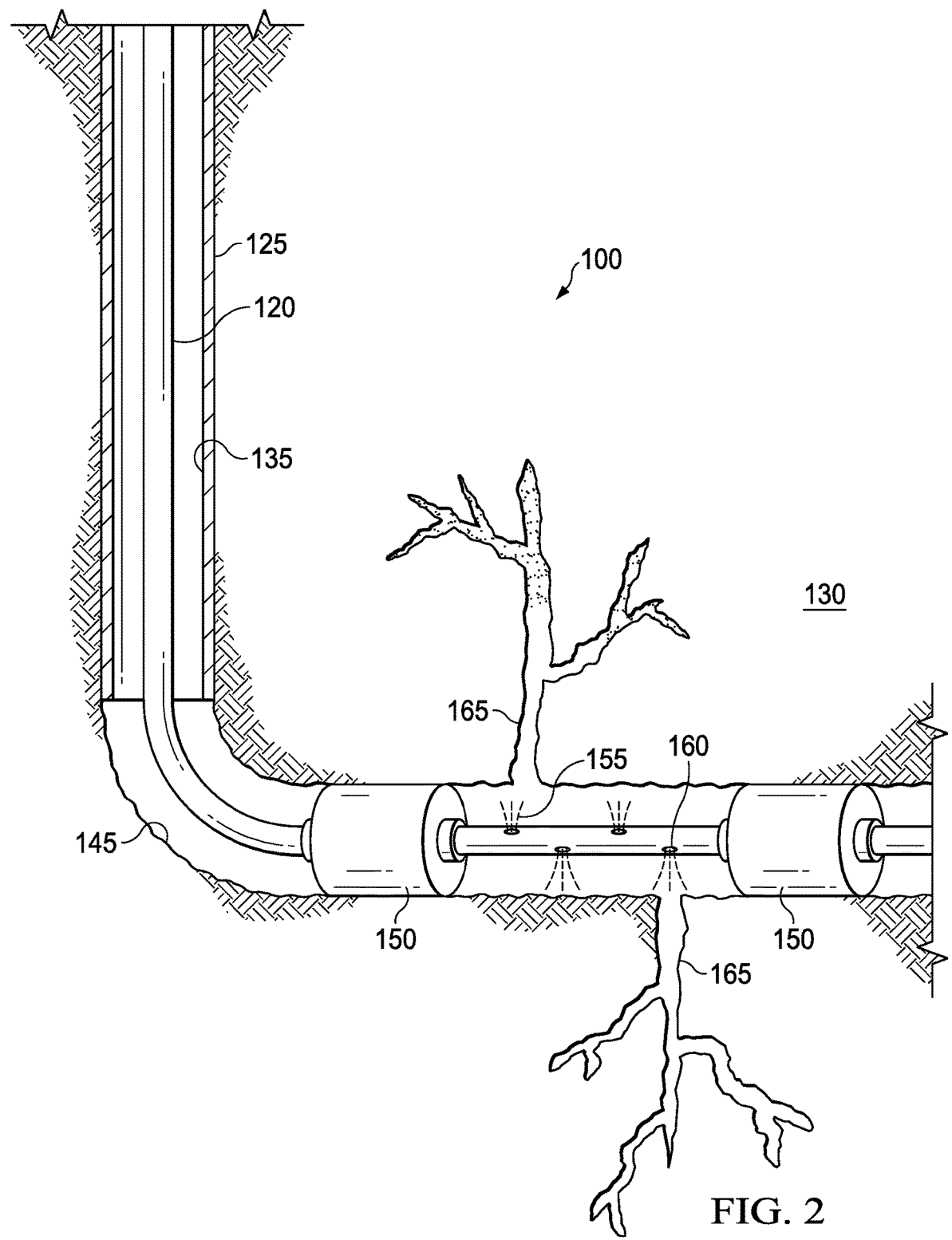
FIG. 2 is a schematic illustrating the placement of a treatment fluid into a fracture in a subterranean formation in accordance with one or more examples described herein.

FIG. 2 illustrates a schematic of the downhole portion of the system 100 illustrated in FIG. 1, according to one or more examples. As depicted in FIG. 2, tubular 120 extends from the wellhead 115 (as illustrated in FIG. 1) into wellbore 125 penetrating subterranean formation 130. After descending through the heel 145 of the wellbore 125, tubular 120 may be coupled to one or more packers 150 positioned to isolate an interval of wellbore 125. A treatment fluid 155, as described herein, may exit tubular 120 through openings 160. The treatment fluid 155 may be introduced into the subterranean formation 130 via a primary fracture 165 of other such opening into the subterranean formation 130. If the treatment fluid 155 is a fracturing fluid, it may have created or enhanced the primary fracture 165. If the treatment fluid 155 is an acidizing fluid, it may contact the walls of the subterranean formation 130, and also the channels within the primary fracture 165 and increase hydrocarbon permeability therethrough. If the treatment fluid 155 is an enhanced oil recovery fluid, it may be partially miscible with, or otherwise assist in conveying, a hydrocarbon fluid flowing out of the subterranean formation 130, thus enhancing hydrocarbon recovery from the subterranean formation 130.

It is to be recognized that system 100 is merely exemplary in nature, and various additional components may be present that have not necessarily been depicted in FIGS. 1 and 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

It should be clearly understood that the examples illustrated by FIGS. 1 and 2 are merely general applications of the principles of this disclosure in practice, and a wide variety of other examples are possible. Therefore, the scope of this disclosure is not limited in any manner to the details of FIGS. 1 and 2 as described herein.

EXAMPLES

The present disclosure may be better understood by reference to the following examples, which are offered by way of illustration. The present disclosure is not limited to the examples provided herein.

Example 1

A comparative experiment was run to test whether aggregated flocculates form in fracturing fluid formulations comprising different electrically charged polymers at varying pH after treatment with a competitive metal binder. Three different friction reducer polymers were used: anionic, cationic, and amphoteric. The pH was varied for each control and experimental treatment group. The competitive metal binder was PAPEMPA, and the loading concentration is disclosed in Table 1 below. The fracturing fluids were contacted with 500 ppm Fe' at 200° F. This is considered to be a high concentration of iron (III).

The friction reducer polymers were hydrated prior to use in the formulation. Twenty gpt of each friction reducer polymer per formulation was added to one liter of tap water and stirred for four minutes. The friction reducer polymers were then allowed to hydrate for a further two hours. The desired loading of PAPEMPA was then added to the experimental samples. The control samples did not comprise PAPEMPA. 500 ppm of Fe' was added, and the pH was adjusted as indicated in Table 1 below. The sample formulations were then heated to 200° F. for sixteen hours. After treatment, the samples were cooled and a visual inspection was made to determine the presence of flocculation aggregates. The formulations and results are illustrated in Table 1 below.

TABLE 1

Formulations and Results

| Sample | 20 gpt Polymer | PAPEMPA Loading (gpt) | pH | Flocculates Present |
|---|---|---|---|---|
| 1 | Anionic | 0 | 2.5 | Y |
| 2 | Anionic | 0 | 8 | Y |
| 3 | Anionic | 0 | 10 | Y |
| 4 | Anionic | 2 | 2.5 | N |
| 5 | Anionic | 2 | 8 | N |
| 6 | Anionic | 2 | 10 | N |
| 7 | Cationic | 0 | 2.5 | Y |
| 8 | Cationic | 0 | 8 | Y |
| 9 | Cationic | 0 | 10 | Y |
| 10 | Cationic | 1 | 2.5 | N |
| 11 | Cationic | 1 | 8 | N |
| 12 | Cationic | 1 | 10 | N |
| 13 | Amphoteric | 0 | 2.5 | Y |
| 14 | Amphoteric | 0 | 8 | Y |
| 15 | Amphoteric | 0 | 10 | Y |
| 16 | Amphoteric | 2 | 2.5 | N |
| 17 | Amphoteric | 2 | 8 | N |
| 18 | Amphoteric | 2 | 10 | N |

Figure 3:
FIG. 3 is a photograph illustrating flocculation in an anionic polymer-based slickwater fracturing fluid after addition of iron(III) in accordance with one or more examples described herein.
Figure 4:
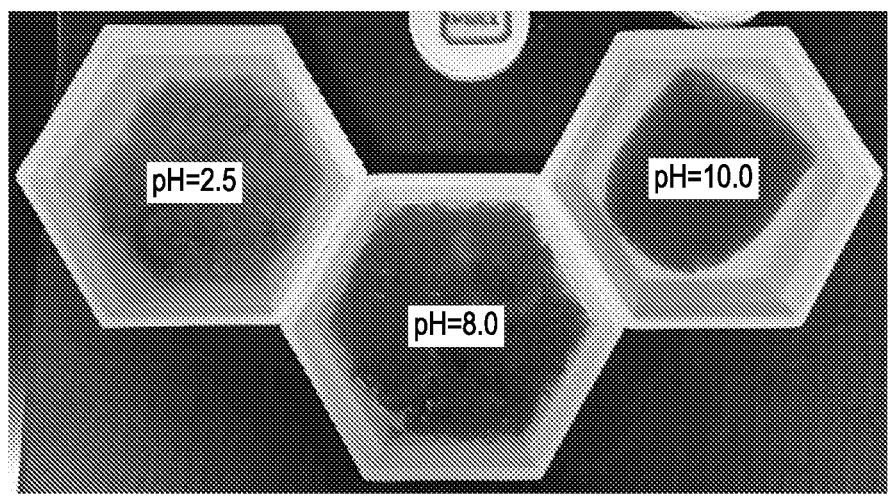
FIG. 4 is another photograph illustrating flocculation in anionic polymer-based slickwater fracturing fluids after addition of iron(III) in accordance with one or more examples described herein.
Figure 5:
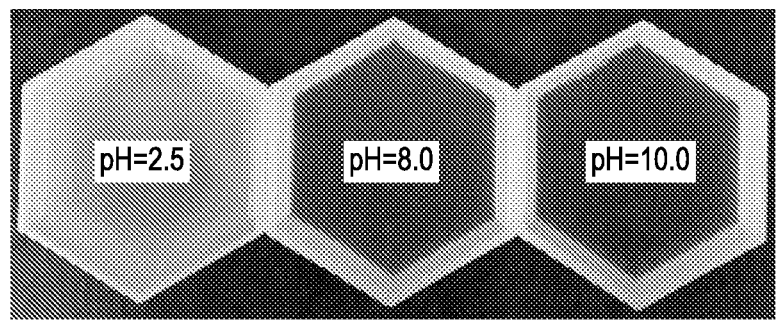
FIG. 5 is a photograph illustrating treated anionic polymer-based slickwater fracturing fluids after addition of iron (III) in accordance with one or more examples described herein.

FIG. 3 is a photograph illustrating an anionic polymer control sample after the immediate addition of the 500 ppm $Fe^{3+}$. Tiny flocculates began to form in the sample upon addition of the metal. FIG. 4 is a photograph illustrating the three anionic control samples (samples 1-3) after adjustment to the noted pH values and after thermal treatment at 200° F. for 16 hours. As illustrated, the flocculates have aggregated into thick, rubbery clumps, leaving behind varying amounts of liquid. FIG. 5 is a photograph illustrating the experimental anionic friction reducer (samples 4-6) after adjustment to the noted three pH values and after thermal treatment at 200° F. for 16 hours. These PAPEMPA treated samples remained fluid and did not form the flocculate aggregates shown in FIG. 4.

Figure 6:
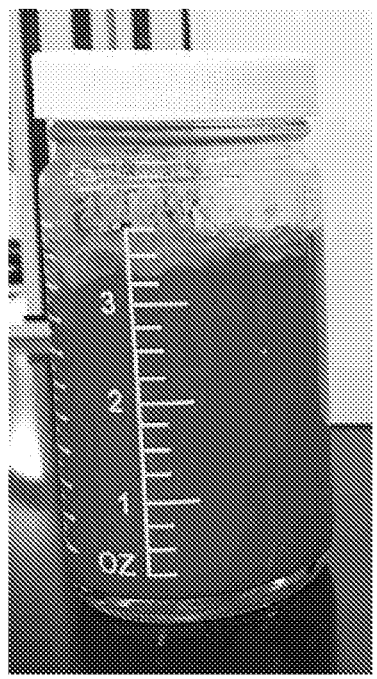
FIG. 6 is a photograph illustrating flocculation in a cationic polymer-based slickwater fracturing fluid after addition of iron(III) in accordance with one or more examples described herein.

FIG. 6 is a photograph illustrating the cationic polymer control sample at a pH of 8 (sample 8) and after thermal treatment at 200° F. for 16 hours. This sample formed thick, rubbery clumps of crosslinked polymer. FIG. 7 is a photograph illustrating two experimental cationic samples at a pH of 8 and after thermal treatment at 200° F. for 16 hours. Two loadings of PAPEMPA were used for these treated samples. The left was 1 gpt (sample 11) and the right was 10 gpt, which was used to test the workability of extreme loading values of the competitive metal binder. Both samples remained fluid and did not form the flocculate aggregates shown in FIG. 6.

FIG. 8 is a photograph illustrating the amphoteric polymer control sample at a pH of 8 (sample 14) and after thermal treatment at 200° F. for 16 hours. This sample formed the thick, rubbery clumps of crosslinked polymer. FIG. 9 is a photograph illustrating an experimental amphoteric sample at a pH of 8 (sample 17) and after thermal treatment at 200° F. for 16 hours. The sample remained fluid and did not form the flocculate aggregates shown in FIG. 8.

For all samples, PAPEMPA was effective at limiting the interaction of the polymers and the metal. Prevention of flocculent aggregates was shown for every polymer species and at all pH values, even at these high loading values of $Fe^{3+}$.

Example 2

A similar comparative experiment was performed as was done in Example 1. However, HEMPA was used as the competitive metal binder instead of PAPEMPA. The fracturing fluids were contacted with 500 ppm $Fe^{3+}$ at 200° F. The experiment tested whether aggregated flocculates would form in fracturing fluid formulations that comprised different electrically charged polymers at varying pH after treatment with the competitive metal binder, HEMPA. Three different friction reducer polymers were used: anionic, cationic, and amphoteric. The pH was varied for each treatment. The fracturing fluids were contacted with 500 ppm $Fe^{3+}$ at 200° F.

The friction reducer polymers were hydrated prior to use in the formulation. Twenty gpt of each friction reducer polymer per formulation was added to one liter of tap water and stirred for four minutes. The friction reducer polymers were then allowed to hydrate for four hours. The desired loading of HEMPA was then added to the experimental samples, as illustrated in Table 2 below. The control samples did not comprise HEMPA. 500 ppm of $Fe^{2+}$ was then added, and the pH was adjusted as indicated in Table 2 below. The sample formulations were then heated to 200° F. for sixteen hours. After treatment, the samples were cooled and a visual inspection was made to determine the presence of flocculation aggregates. The formulations and results are illustrated in Table 2 below.

TABLE 2

Formulations and Results

| Sample | 20 gpt Polymer | HEMPA Loading (gpt) | pH | Flocculates Present |
|---|---|---|---|---|
| 22 | Anionic | 2 | 2.5 | N |
| 23 | Anionic | 2 | 8 | N |
| 24 | Anionic | 2 | 10 | N |
| 25 | Cationic | 2 | 2.5 | N |
| 26 | Cationic | 2 | 8 | N |
| 27 | Cationic | 2 | 10 | N |
| 28 | Amphoteric | 2 | 2.5 | N |
| 29 | Amphoteric | 2 | 8 | N |
| 30 | Amphoteric | 2 | 10 | N |

Figure 10:
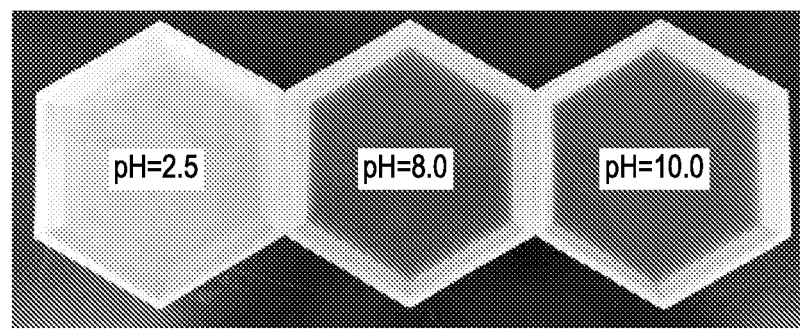
FIG. 10 is a photograph illustrating treated anionic polymer-based slickwater fracturing fluids after addition of iron (III) in accordance with one or more examples described herein.

FIG. 10 is a photograph illustrating the three experimental anionic samples (samples 22-24) after adjustment to the noted pH values and after thermal treatment at 200° F. for 16 hours. These HEMPA treated samples remained fluid and did not form the flocculate aggregates shown in FIG. 4 (samples 1-3).

Figure 11:
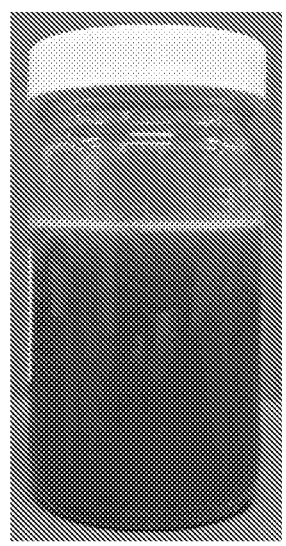
FIG. 11 is a photograph illustrating a treated cationic polymer-based slickwater fracturing fluid after addition of iron(III) in accordance with one or more examples described herein.

FIG. 11 is a photograph illustrating an experimental cationic sample at a pH of 8 (sample 26) after thermal treatment at 200° F. for 16 hours. The sample remained fluid and did not form the flocculate aggregates shown in FIG. 6 (sample 8).

Figure 12:
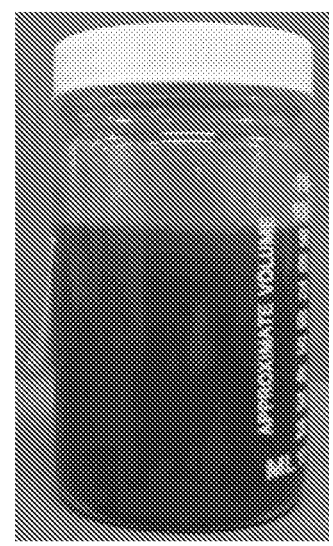
FIG. 12 is a photograph illustrating a treated amphoteric polymer-based slickwater fracturing fluid after addition of iron(III) in accordance with one or more examples described herein.

FIG. 12 is a photograph illustrating an experimental amphoteric sample at a pH of 8 (sample 29) after thermal treatment at 200° F. for 16 hours. The sample remained fluid and did not form the flocculate aggregates shown in FIG. 8 (sample 14).

For all samples, HEMPA was effective at limiting the interaction of the polymers and the metal. Prevention of flocculent aggregates was shown for every polymer species and at all pH values, even for these high loading values of $Fe^{3+}$.

It is also to be recognized that the disclosed treatment fluids may also directly or indirectly affect the various downhole equipment and tools that may contact the treatment fluids disclosed herein. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other Provided are methods of treating a subterranean formation in accordance with the disclosure. An example method comprises introducing a treatment fluid into a wellbore penetrating the subterranean formation. The treatment fluid comprises a competitive metal binder selected from the group consisting of polyamino polyether methylene phosphonic acid, hydoxyethylamino-di(methylene phosphonic acid), and a combination thereof a polymer capable of forming a polymer-metal complex; and an aqueous fluid. The method further comprises contacting a metal ion with the treatment fluid after introduction of the treatment fluid into the wellbore and binding the metal ion with the competitive metal binder.

Additionally or alternatively, the method may include one or more of the following features individually or in combination. The competitive metal binder may comprise the polyamino polyether methylene phosphonic acid. The competitive metal binder may comprise the hydoxyethylamino-di(methylene phosphonic acid). The treatment fluid may be a fracturing fluid, acidizing fluid, polymer flooding fluid for enhanced oil recovery, or a fluid for coiled tubing milling. The polymer may be a polyacrylamide. The polymer may comprise a moiety selected from the group consisting of an acrylic acid moiety, a 2-acrylamido-2-methylpropane sulfonic acid moiety, a trimethyl aminoethyl acrylate moiety, a trimethyl aminoethyl methacrylate moiety, and any combination thereof. The polymer may comprise an ethylene repeating unit including a —$C(O)N(R^1)_2$ group or a —$C(O)OR^2$ group, where at each occurrence, $R^1$ is independently selected from the group consisting of —H, —$C_2H_4OH$, —$CH_3$, or —$(CH_2)_nCH_3$ and where n=0 to 25, and at each occurrence, $R^2$ is independently selected from the group consisting of —H, a substituted or unsubstituted (C1-C20) hydrocarbyl, or a counterion selected from H, Li, Na, K, Cs, Be, Mg, Ca, Sr, Ba, Cr, Fe, Mn, Co, Ni, Cu, Ga, In, or $NH_4$. The polymer may be anionic. The metal ion may be $Fe^{2+}$, $Fe^{3+}$, $Cr^{3+}$, $Cr^{4+}$, $Al^{3+}$, $Sb^{5+}$, $Ti^{4+}$, $Zr^{4+}$, or any combination thereof.

Provided are treatment fluids in accordance with the disclosure. An example treatment fluid comprises a competitive metal binder selected from the group consisting of polyamino polyether methylene phosphonic acid, hydoxyethylamino-di(methylene phosphonic acid), and a combination thereof a polymer capable of forming a polymer-metal complex; and an aqueous fluid.

Additionally or alternatively, the treatment fluid may include one or more of the following features individually or in combination. The competitive metal binder may comprise the polyamino polyether methylene phosphonic acid. The competitive metal binder may comprise the hydoxyethylamino-di(methylene phosphonic acid). The treatment fluid may be a fracturing fluid, acidizing fluid, polymer flooding fluid for enhanced oil recovery, or a fluid for coiled tubing milling. The polymer may be a polyacrylamide. The polymer may comprise a moiety selected from the group consisting of an acrylic acid moiety, a 2-acrylamido-2-methylpropane sulfonic acid moiety, a trimethyl aminoethyl acrylate moiety, a trimethyl aminoethyl methacrylate moiety, and any combination thereof. The polymer may comprise an ethylene repeating unit including a —C(O)N($R^1$)$_2$ group or a —C(O)O$R^2$ group, where at each occurrence, $R^1$ is independently selected from the group consisting of —H, —C$_2$H$_4$OH, —CH$_3$, or —(CH$_2$)$_n$CH$_3$ and where n=0 to 25, and at each occurrence, $R^2$ is independently selected from the group consisting of —H, a substituted or unsubstituted (C1-C20) hydrocarbyl, or a counterion selected from H, Li, Na, K, Cs, Be, Mg, Ca, Sr, Ba, Cr, Fe, Mn, Co, Ni, Cu, Ga, In, or NH$_4$. The polymer may be anionic. The metal ion may be $Fe^{2+}$, $Fe^{3+}$, $Cr^{3+}$, $Cr^{4+}$, $Al^{3+}$, $Sb^{5+}$, $Ti^{4+}$, $Zr^{4+}$, or any combination thereof.

Provided are systems for treating a subterranean formation in accordance with the disclosure. An example system comprises a treatment fluid composition comprising: a competitive metal binder selected from the group consisting of polyamino polyether methylene phosphonic acid, hydoxyethylamino-di(methylene phosphonic acid), and a combination thereof; a polymer capable of forming a polymer-metal complex; and an aqueous fluid. The system further comprises mixing equipment configured to mix the competitive metal binder, the polymer, and the aqueous fluid; and a pump fluidly coupled to a tubular extending into a wellbore penetrating the subterranean formation, wherein the tubular is configured to circulate or otherwise convey the treatment fluid composition in the wellbore.

Additionally or alternatively, the system may include one or more of the following features individually or in combination. The competitive metal binder may comprise the polyamino polyether methylene phosphonic acid. The competitive metal binder may comprise the hydoxyethylaminodi(methylene phosphonic acid). The treatment fluid may be a fracturing fluid, acidizing fluid, polymer flooding fluid for enhanced oil recovery, or a fluid for coiled tubing milling. The polymer may be a polyacrylamide. The polymer may comprise a moiety selected from the group consisting of an acrylic acid moiety, a 2-acrylamido-2-methylpropane sulfonic acid moiety, a trimethyl aminoethyl acrylate moiety, a trimethyl aminoethyl methacrylate moiety, and any combination thereof. The polymer may comprise an ethylene repeating unit including a —C(O)N($R^1$)$_2$ group or a —C(O)O$R^2$ group, where at each occurrence, $R^1$ is independently selected from the group consisting of —H, —C$_2$H$_4$OH, —CH$_3$, or —(CH$_2$)$_n$CH$_3$ and where n=0 to 25, and at each occurrence, $R^2$ is independently selected from the group consisting of —H, a substituted or unsubstituted (C1-C20) hydrocarbyl, or a counterion selected from H, Li, Na, K, Cs, Be, Mg, Ca, Sr, Ba, Cr, Fe, Mn, Co, Ni, Cu, Ga, In, or NH$_4$. The polymer may be anionic. The metal ion may be $Fe^{2+}$, $Fe^{3+}$, $Cr^{3+}$, $Cr^{4+}$, $Al^{3+}$, $Sb^{5+}$, $Ti^{4+}$, $Zr^{4+}$, or any combination thereof.

Additionally or alternatively, the system may include one or more of the following features individually or in combination. The competitive metal binder may comprise the polyamino polyether methylene phosphoric acid. The competitive metal binder may comprise the hydoxyethylaminodi(methylene phosphonic acid). The treatment fluid may be a fracturing fluid, acidizing fluid, polymer flooding fluid for enhanced oil recovery, or a fluid for coiled tubing milling. The polymer may be a polyacrylamide. The polymer may comprise a moiety selected from the group consisting of an acrylic acid moiety, a 2-acrylamido-2-methylpropane sulfonic acid moiety, a trimethyl aminoethyl acrylate moiety, a trimethyl aminoethyl methacrylate moiety, and any combination thereof. The polymer may comprise an ethylene repeating unit including a —C(O)N($R^1$)$_2$ group or a —C(O)O$R^2$ group, where at each occurrence, $R^1$ is independently selected from the group consisting of —H, —C$_2$H$_4$OH, —CH$_3$, or —(CH$_2$)$_n$CH$_3$ and where n=0 to 25, and at each occurrence, $R^2$ is independently selected from the group consisting of —H, a substituted or unsubstituted (C1-C20) hydrocarbyl, or a counterion selected from H, Li, Na, K, Cs, Be, Mg, Ca, Sr, Ba, Cr, Fe, Mn, Co, Ni, Cu, Ga, In, or NH$_4$. The polymer may be anionic. The metal ion which may be complexed with polymer may be $Fe^{2+}$, $Fe^{3+}$, $Cr^{3+}$, $Cr^{4+}$, $Al^{3+}$, $Sb^{5+}$, $Ti^{4+}$, $Zr^{4+}$, or any combination thereof. The tubular may comprise a portion that is rusted, wherein the rusted portion of the tubular is located such that the treatment fluid composition contacts the rusted portion as the treatment fluid composition is circulated in the tubular.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of" or "consist of the various components and steps." Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A treatment fluid composition comprising:
a competitive metal binder selected from the group consisting of polyamino polyether methylene phosphonic acid, hydoxyethylamino-di(methylene phosphonic acid), and a combination thereof; wherein the competitive metal binder is present in the treatment fluid at a concentration in a range of about 0.05% (w/w) to about 5% (w/w) and is configured to sequester a metal ion before the metal ion forms a polymer-metal complex with the polymer;
a polymer capable of forming the polymer-metal complex; wherein the polymer is anionic, cationic, or amphoteric; and
an aqueous fluid.

2. The treatment fluid composition of claim 1, wherein the competitive metal binder comprises the polyamino polyether methylene phosphonic acid.

3. The treatment fluid composition of claim 1, wherein the competitive metal binder comprises the hydoxyethylamino-di(methylene phosphonic acid).

4. The treatment fluid composition of claim 1, wherein the polymer is a polyacrylamide.

5. The treatment fluid composition of claim 1, wherein the polymer comprises a moiety selected from the group consisting of an acrylic acid moiety, a 2-acrylamido-2-methylpropane sulfonic acid moiety, a trimethyl aminoethyl acrylate moiety, a trimethyl aminoethyl methacrylate moiety, and any combination thereof.

6. The treatment fluid composition of claim 1, wherein the polymer comprises an ethylene repeating unit including a —C(O)N(R$^1$)$_2$ group or a —C(O)OR$^2$ group, where at each occurrence, R$^1$ is independently selected from the group consisting of —H, —C$_2$H$_4$OH, —CH$_3$, or —(CH$_2$)$_n$CH$_3$ and where n=0 to 25, and at each occurrence, R$^2$ is independently selected from the group consisting of —H, a substituted or unsubstituted (C1-C20) hydrocarbyl, or a counterion selected from H, Li, Na, K, Cs, Be, Mg, Ca, Sr, Ba, Cr, Fe, Mn, Co, Ni, Cu, Ga, In, or NH4.

7. The treatment fluid composition of claim 1, wherein the polymer is anionic.

8. A method for treating a subterranean formation, the method comprising:
introducing a treatment fluid into a wellbore penetrating the subterranean formation, the treatment fluid comprising:
a competitive metal binder selected from the group consisting of polyamino polyether methylene phosphonic acid, hydoxyethylamino-di(methylene phosphonic acid), and a combination thereof; wherein the competitive metal binder is present in the treatment fluid at a concentration in a range of about 0.05% (w/w) to about 5% (w/w);
a polymer capable of forming a polymer-metal complex; wherein the polymer is anionic, cationic, or amphoteric; and
an aqueous fluid;
contacting a metal ion with the treatment fluid after introduction of the treatment fluid into the wellbore;
binding the metal ion with the competitive metal binder; and
sequestering the metal ion before the metal ion forms the polymer-metal complex with the polymer.

9. The method of claim 1, wherein the competitive metal binder comprises the polyamino polyether methylene phosphonic acid.

10. The method of claim 1, wherein the competitive metal binder comprises the hydoxyethylamino-di(methylene phosphonic acid).

11. The method of claim 1, wherein the treatment fluid is a fracturing fluid, acidizing fluid, polymer flooding fluid for enhanced oil recovery, or a fluid for coiled tubing milling.

12. The method of claim 1, wherein the polymer is a polyacrylamide.

13. The method of claim 1, wherein the polymer comprises a moiety selected from the group consisting of an acrylic acid moiety, a 2-acrylamido-2-methylpropane sulfonic acid moiety, a trimethyl aminoethyl acrylate moiety, a trimethyl aminoethyl methacrylate moiety, and any combination thereof.

14. The method of claim 1, wherein the polymer comprises an ethylene repeating unit including a —C(O)N(R$^1$)$_2$ group or a —C(O)OR$^2$ group, where at each occurrence, R$^1$ is independently selected from the group consisting of —H, —C$_2$H$_4$OH, —CH$_3$, or —(CH$_2$)$_n$CH$_3$ and where n=0 to 25, and at each occurrence, R$^2$ is independently selected from the group consisting of —H, a substituted or unsubstituted (C1-C20) hydrocarbyl, or a counterion selected from H, Li, Na, K, Cs, Be, Mg, Ca, Sr, Ba, Cr, Fe, Mn, Co, Ni, Cu, Ga, In, or NH$_4$.

15. The method of claim 1, wherein the polymer is anionic.

16. The method of claim 1, wherein the metal ion is Fe$^{2+}$, Fe$^{3+}$, Cr$^{3+}$, Cr$^{4+}$, Al$^{3+}$, Sb$^{5+}$, Ti$^{4+}$, Zr$^{4+}$, or any combination thereof.

17. A system for treating a subterranean formation, the system comprising:
a treatment fluid composition comprising:
a competitive metal binder selected from the group consisting of polyamino polyether methylene phosphonic acid, hydoxyethylamino-di(methylene phosphonic acid), and a combination thereof; wherein the competitive metal binder is present in the treatment fluid at a concentration in a range of about 0.05% (w/w) to about 5% (w/w) and is configured to sequester a metal ion before the metal ion forms a polymer-metal complex with a polymer;
the polymer capable of forming the polymer-metal complex; wherein the polymer is anionic, cationic, or amphoteric; and
an aqueous fluid; and
mixing equipment configured to mix the competitive metal binder, the polymer, and the aqueous fluid; and
a pump fluidly coupled to a tubular extending into a wellbore penetrating the subterranean formation, wherein the tubular is configured to circulate or otherwise convey the treatment fluid composition in the wellbore.

18. The system of claim 17, wherein the polymer is a polyacrylamide.

19. The system of claim 17, wherein the polymer comprises a moiety selected from the group consisting of an acrylic acid moiety, a 2-acrylamido-2-methylpropane sulfonic acid moiety, a trimethyl aminoethyl acrylate moiety, a trimethyl aminoethyl methacrylate moiety, and any combination thereof.

20. The system of claim 17, wherein the tubular comprises a portion that is rusted, wherein the rusted portion of the tubular is located such that the treatment fluid composition contacts the rusted portion as the treatment fluid composition is circulated in the tubular.

\* \* \* \* \*